United States Patent [19]

Currie et al.

[11] 3,907,868

[45] Sept. 23, 1975

[54] POLYESTER WASTE RECOVERY

[75] Inventors: Robert Marion Currie; Shubert Gernt Measamer, both of Circleville, Ohio; Donald Nelson Miller, Wilmington, Del.

[73] Assignee: E. I. Du Pont de Nemours and Company, Wilmington, Del.

[22] Filed: Feb. 15, 1974

[21] Appl. No.: 442,910

[52] U.S. Cl............................. 260/475 D; 260/2.3
[51] Int. Cl.².......................................... C07C 69/82
[58] Field of Search.......................... 260/475 D, 2.3

[56] References Cited
UNITED STATES PATENTS
3,488,298    1/1970    Barkey et al......................... 260/2.3

FOREIGN PATENTS OR APPLICATIONS
68,500      10/1969    Germany ........................ 260/475 D
1,247,391    8/1967    Germany ........................ 260/475 D
762,690     12/1956    United Kingdom............. 260/475 D

*Primary Examiner*—Anton H. Sutto
*Assistant Examiner*—E. Jane Skelly

[57] ABSTRACT

A continuous process for the recovery of a dimethyl terephthalate from polyethylene terephthalate wastes by:
1. dissolving and reacting the wastes with ethylene glycol,
2. reacting the product of step (1) with an excess of a methanol, in the presence of an ester exchange catalyst and at an elevated temperature and pressure to prepare dimethyl terephthalate,
3. deactivating the ester exchange catalyst before release of the elevated pressure,
4. distilling excess methanol,
5. removing solids, which flocculate during the above steps, while the solution is still hot, and
6. recovering the dimethyl terephthalate.

In a preferred embodiment, dimethyl terephthalate and ethylene glycol are recovered for reuse in the manufacture of polyethylene terephthalate.

17 Claims, 2 Drawing Figures

POLYESTER WASTE RECOVERY

BACKGROUND OF THE INVENTION

This invention relates in general to the recovery of polyester wastes and, in a preferred embodiment, relates to recovery of dimethyl terephthalate from polyethylene terephthalate wastes.

High molecular weight polyesters of terephthalic acid and aliphatic dihydric alcohols are well known in the art. In the case of polyethylene terephthalate, a commercially preferred polyester, the polyester is generally prepared by contacting an organic ester of terephthalic acid (e.g., dimethyl terephthalate) with ethylene glycol in the presence of an ester exchange catalyst to form dihydroxyethyl terephthalate monomer, and then polymerizing the monomer to high molecular weight using condensation polymerization techniques. Details of this process are disclosed in U.S. Pat. No. 2,465,319 to Whinfield and Dickson. Various inert additives are introduced during this process, depending on the ultimate use of the polyester.

These high molecular weight polyesters, and particularly polyethylene terephthalate, have found use in commerce for the manufacture of packaging film, fibers, electrical insulators, molded articles, etc. The various manufacturing processes, however, generate considerable waste as the polyester is processed into commercial form. For instance, considerable edge trim, slitting trim, and reject material is generated when polyethylene terephthalate is extruded as a film, biaxially stretched, and slit into widths desired by customer industries.

The industry has long recognized that recycle of waste polyethylene would conserve raw materials, improve process economics, and eliminate the problem of waste disposal. Many recycle processes have been proposed for this purpose, but none has proven to be entirely satisfactory.

One proposal has been to dissolve the wastes in molten dihydroxyethyl terephthalate monomer, or another polymer precursor, and thus directly recycle the scrap. Resulting polyethylene terephthalate, however, is generally inferior to polymer made from virgin monomer since it is extremely difficult, in such a process, to prepare polymer having uniform properties, color, and distribution of polymer additives.

A second proposal has been to degrade waste polyester with a lower alkyl alcohol, and to recycle the degraded waste. For instance, U.S. Pat. No. 3,257,335 discloses a process wherein waste polyethylene terephthalate is dissolved and reacted with ethylene glycol, reversing the condensation reaction, to prepare dihydroxyethyl terephthalate monomer and low molecular weight oligomers (dimers, trimers, etc.) thereof which are subsequently combined with virgin monomer and polymerized to polyethylene terephthalate. While this process has proven to be very useful, resulting polymer does not have the exceptional properties obtained with virgin dihydroxyethyl terephthalate, especially when using a high ratio of recycle waste. The decreased properties are due to the formation of diethylene glycol during the reaction of waste with ethylene glycol. When the diethylene glycol is subsequently copolymerized with dihydroxyethyl terephthalate, the resulting copolyester has lower strength and generally poorer properties than pure polyethylene terephthalate. In addition, the problems noted in a direct waste recycle process are still experienced, although to a lesser extent.

Alternatively, the art has proposed the reaction of waste polyethylene terephthalate with methanol to prepare dimethyl terephthalate. The recovered dimethyl terephthalate is then used as feed to the ester exchange step in the polyethylene terephthalate manufacturing process. A major deficiency in such a process, however, is the difficulty of introducing solid wastes at the high pressure required to cause polymer degradation. Since waste fed to the process is a solid, the process is conducted as a batch operation with resulting storage requirements and inefficiencies inherent in a batch process.

A third proposal has been to degrade the polyethylene terephthalate wastes in a two-step process. In the first step, the wastes are degraded with ethylene glycol to prepare a solution containing dihydroxyethyl terephthalate and low molecular weight oligomers thereof. In the second step, the solution is reacted with methanol to further degrade the oligomers and to convert the terephthalate values to dimethyl terephthalate. The second step can employ an ester exchange catalyst to expedite the preparation of dimethyl terephthalate as proposed in East German Pat. No. 68,500 wherein resulting solution rich in dimethyl terephthalate is subsequently cooled to crystallize dimethyl terephthalate for recovery. To bring about crystallization, however, the ester exchange reaction mass must be cooled, with resulting heat loss. Moreover, impurities such as diethylene glycol are occluded in the dimethyl terephthalate solids formed by crystallization, other solids are entrained with dimethyl terephthalate as it is removed by filtration or other solid removal operations, and separation by crystallization is a relatively slow operation difficult to integrate in a continuous process.

Thus, the art has continued to seek an economical continuous process for the recovery of waste polyethylene terephthalate wherein the recovered components have sufficient purity to be used in large quantity in the manufacture of polyethylene terephthalate. Especially desirable is a continuous process wherein inert additives present in the wastes are removed, yielding recovered components which can be recycled independent of the particular end-use formulation of the polyethylene terephthalate then being made.

SUMMARY OF THE INVENTION

The present invention provides, in a process for the recovery of dialkyl terephthalate from polyethylene terephthalate waste by:

1. dissolving and reacting the waste with a dihydric alcohol to prepare liquid reaction solution,
2. contacting the liquid reaction solution with an excess of a monohydric alcohol and an ester exchange catalyst at an elevated temperature and superatmospheric pressure to prepare dialkyl terephthalate, and
3. recovering dialkyl terephthalate from the liquid reaction solution, the improvement wherein the process is continuous and a. a sequestering agent for the ester exchange catalyst is introduced to the hot liquid reaction solution of step (2) before release of the superatmospheric pressure,
b. excess monohydric alcohol is distilled from the hot liquid reaction solution, c. solids are removed from the hot liquid reaction solution at a temperature above about 125°C., and
d. dialkyl terephthalate is recovered from the hot liquid reaction solution.

The process is particularly useful for recovering dimethyl terephthalate and ethylene glycol from waste polyethylene terephthalate, the recovered compounds having sufficient purity to be used in the manufacture of high-quality polyethylene terephthalate.

DETAILED DESCRIPTION OF THE INVENTION

Figure 1:
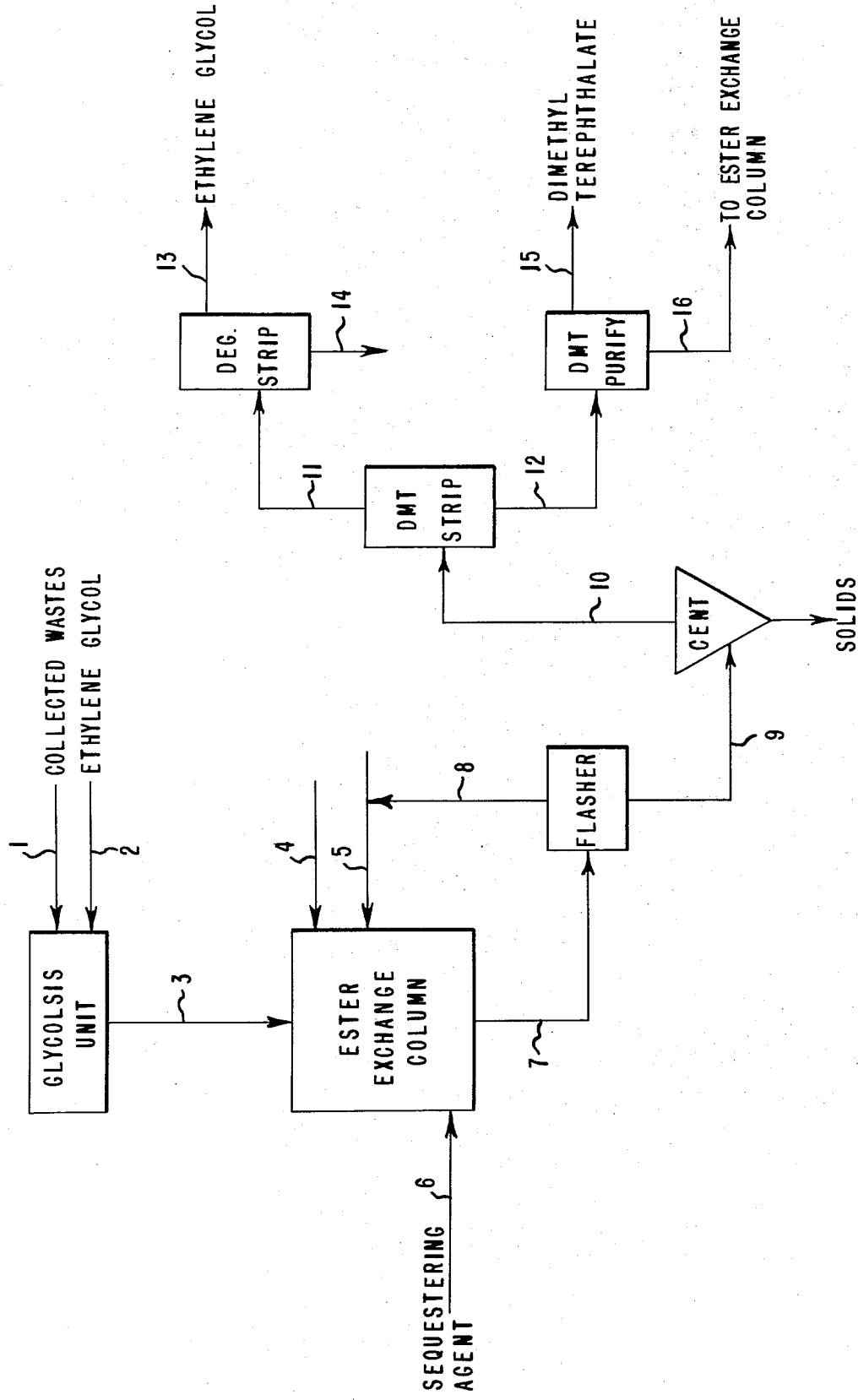
FIG. 1 is a flow sheet showing a preferred embodiment of the process.

In practicing the invention, waste accumulated during the manufacture of polyethylene terephthalate film, fiber, or shaped articles is first collected for recovery. The collected waste can come from different product lines since inert additives present in the wastes are removed during the recovery process. Likewise, the collected waste can have varying molecular weight since the waste is converted to dialkyl terephthalate during the recovery process.

Since the waste is continuously converted to dialkyl terephthalate under superatmospheric pressure, and since it is more convenient to employ a solution feed than a solid or slurry feed in a continuous pressurized process, the collected waste is fed to a glycolysis reactor wherein the waste is dissolved and degraded with a dihydric alcohol to form a solution. For ease in handling, the waste is generally roughly comminuted prior to being fed to the glycolysis unit.

Suitable methods for degrading polyethylene terephthalate with glycols are well known in the art. Ethylene glycol is normally the selected glycol, and is employed in quantity sufficient to degrade the polyester into solution, but small enough that substantially all the glycol is consumed during degradation of the polyester. Larger quantities of glycol could be used but are not desirable since excess glycol must ultimately be separated from the dialkyl terephthalate product and excess glycol can reduce the efficiency of the ester exchange reaction employed to prepare the dialkyl terephthalate.

The ethylene glycol-degraded waste solution contains dihydroxyethyl terephthalate and low molecular weight oligomers thereof, diethylene glycol resulting from the condensation of ethylene glycol, residual ethylene glycol, and various impurities and additives present in the waste. As used herein, the term "oligomers" refers to partially degraded polyethylene terephthalate capped, at the point of chain scission, primarily with ethylene glycol units. Generally, the oligomers have 2, 3, 4, 5, etc. polyethylene terephthalate units.

U.S. Pat. No. 3,257,335 to Whitfield et al., incorporated herein by reference, discloses a two-stage glycolysis unit which can advantageously be used in the instant process. In the Whitfield et al. unit, particulate polyethylene terephthalate waste and ethylene glycol are continuously fed to a first stage operated at atmospheric pressure wherein the waste is dissolved and partially depolymerized. Solution is continuously withdrawn from the first stage and introduced to a second stage maintained under pressure, along with additional ethylene glycol, wherein depolymerization continues. The quantities of ethylene glycol fed to the two stages are selected to degrade the polymer to dihydroxyethyl terephthalate and oligomers thereof without any substantial quantity of ethylene glycol remaining when degradation has reached the desired degree of completion.

Glycol-degraded waste solution from the Whitfield et al. apparatus, or another glycolysis unit, is then continuously fed to an ester exchange column wherein the degraded waste solution is contacted with an excess of monohydric alcohol and an ester exchange catalyst at an elevated temperature and superatmospheric pressure to convert dihydroxyethyl terephthalate and oligomers present in the solution to dialkyl terephthalate. The monohydric alcohol is selected in accordance with the desired dialkyl terephthalate; i.e., methanol is selected to prepare dimethyl terephthalate, a preferred feed for making polyethylene terephthalate, and the process is hereinafter described with respect to methanol.

The ester exchange is a reversible reaction requiring a stoichiometric excess of methanol, elevated temperature, and an ester exchange catalyst to drive the reaction to acceptable yields of dimethyl terephthalate within a reasonable holding time. The weight ratio of methanol to glycol-degraded waste is generally at least 2 to 1, preferably at least 3 to 1, and the temperature within the ester exchange column is generally maintained above about 180°C. The temperature, however, will generally be less than about 300°C. since the vapor pressure of methanol at higher temperatures unduly complicates construction of the ester exchange column and supporting equipment. Preferred operating temperatures are within the range of about 190° to 230°C.

A pressurized ester exchange vessel is employed to avoid loss of methanol vapors during the ester exchange reaction since removal of methanol will decrease the yield of dimethyl terephthalate. In this case, the vessel is operated at a pressure substantially the same as the partial vapor pressure of methanol at the elevated temperature of the vessel.

Useful ester exchange catalysts are well known in the art and include, for example, catalysts disclosed in U.S. Pat. No. 2,465,319 to Whinfield et al., incorporated herein by reference. Representative catalyst include metal salts of acetic acid, such as zinc and manganese acetate, and organic amines, such as triethyl and tributylamine. Other catalysts which can be used to advantage will be readily apparent to those skilled in the art. The catalyst is generally used as a solution for ease in pumping to the pressurized ester exchange vessel. Optimum quantities of a particular catalyst can readily be determined for given ester exchange conditions by varying the quantity added and monitoring the degree of conversion.

Up to about 90 percent of the terephthalate values present in the glycol-degraded waste are converted to dimethyl terephthalates in holding times of about 30 to 60 minutes. When the ester exchange reaction has reached the desired degree of completion, an appropriate sequestering agent is continuously added to the hot solution to deactivate the ester exchange catalyst. Addition of the sequestering agent is accomplished while the solution is still under superatmospheric pressure, i.e., the catalyst is deactivated before excess methanol is flashed from the solution. The sequestering agent, in solution, is advantageously added to the ester exchange vessel at a point where the sequestering agent does not migrate to prematurely deactivate the ester exchange catalyst, or may be added to a separate vessel provided for this purpose.

Useful catalyst sequestering agents are known in the art and include, but are not limited to, phosphoric acid; phosphorous acid; aryl, alkyl, cycloalkyl, and aralkyl phosphite phosphate esters; aliphatic and aromatic carboxylic acids such as oxalic acid, citric acid, tartaric acid and terephthalic acid, the tetradosodium salt of ethylene diamine tetraacetic acid; phenyl phosphinic acid; and the like. The amount of the selected sequestering agent used should be sufficient to effectively deactivate the catalyst since active catalyst will promote undesired ester exchange in following operations, reducing the yield of dimethyl terephthalate.

The hot solution, after introduction of the sequestering agent, contains dimethyl terephthalate, small quantities of unreacted dihydroxyethyl terephthalate and oligomers, small quantities of hydroxyethyl methyl terephthalate mixed esters resulting from incomplete ester exchange, catalyst residues, inert material introduced with the waste, ethylene glycol, diethylene glycol, and excess methanol from the ester exchange reaction. This hot solution is then processed for the removal of excess methanol.

The methanol can be removed in a flasher unit maintained at a lower pressure, preferably atmospheric pressure, wherein substantially all of the methanol is flashed to the vapor state. Sufficient heat is added to the flasher to maintain temperatures above the melting point of the solution but below the temperature at which significant reaction occurs between ethylene glycol and dimethyl terephthalate. Temperatures between 130° to 160°C. are suitable for this purpose.

Alternatively, a two-stage process for the removal of methanol can be used to particular advantage. In the first stage, hot solution containing deactivated ester exchange catalyst is further heated in a partially filled vessel, without release of the superatmospheric pressure maintained during the ester exchange, to continuously evolve methanol vapors therefrom. A methanol vapor barrier is established between this solution and solution containing the active ester exchange catalyst, and the evolving methanol vapors are continuously returned to the latter by passage through the methanol vapors present in the solution are removed in a flasher unit maintained at atmospheric pressure, as described hereinbefore. This two-stage process will be described in detail hereinafter with reference to FIG. 2.

Unexpectedly, hot liquid leaving the flasher unit contains flocculated solids. Small particulate additives present in the waste (such as slip and handling agents, generally having a size of 10 microns or less) are extremely difficult to remove from the glycol-degraded waste, but tend to be flocculated after the ester exchange and methanol flashing steps. Moreover, the ester exchange catalyst residues tend to separate at this point of the process. Flocculation advantageously occurs at a point in the process where the solution has a temperature and viscosity particularly suited for solids removal. Thus, the hot reaction solution, after removal of methanol, is continuously fed to an instream solids separator unit which removes and discharges solids from the process. Removal of solids at this point prevents the deposition of solids, and clotting, in subsequent lines and equipment during the recovery of dimethyl terephthalate and other values from the solution.

The solution leaving the flasher unit is at about 130° to 160°C. and should not be allowed to cool below about 125°C. prior to or during the solids removal operation. Dimethyl terephthalate starts to crystallize at about 125°C. and will be separated with the flocculated solids if lower temperatures are employed. Preferably, the solids removal operation is conducted at about 140° to 160°C. to minimize dimethyl terephthalate losses. A conventional centrifuge, filter, or settling equipment can be employed.

After removal of solids, the hot solution is processed for the recovery of dimethyl terephthalate by distillation, crystallization, sublimation, or a combination of these techniques. Preferably, the aliphatic components (ethylene glycol and diethylene glycol) are first distilled from the solution for recycle or purge from the process and then dimethyl terephthalate is recovered from the solution.

A preferred embodiment of the process will now be described with respect to the flow diagram of FIG. 1 and with respect to a preferred method for contacting the glycol-degraded waste solution with a monohydric alcohol to prepare dialkyl terephthalate using the ester exchange column of FIG. 2. The method of preparing the dialkyl terephthalate and the ester exchange column are described in detail and claimed in copending coassigned application Ser. No. 442,908, filed Feb. 15, 1974, of D. N. Miller, filed herewith, for "Apparatus and a Continuous Process for Converting Polyester Wastes to Dialkyl Terephthalate", incorporated herein by reference.

Waste accumulation during the manufacture of polyethylene terephthalate film is collected at a central storage point. Since the waste comes from many product lines, it contains diverse quantities of the various inert additives commonly employed to modify film electrical properties, slip and blocking characteristics, etc. The waste is comminuted for ease in handling as feed to the waste recovery process.

The collected wastes and ethylene glycol are continuously fed, by lines 1 and 2, respectively, to a two-stage continuous glycolysis unit of the type described in U.S. Pat. No. 3,257,335 to Whitfield et al. In the first stage, maintained at 210° to 260°C. (preferably 220° to 225°C.) and atmospheric pressure, the waste is dissolved and partially depolymerized with ethylene glycol. In the second stage, maintained at 220° to 250°C. (preferably about 240°C.) and sufficient pressure to prevent boiling of the reaction solution, solution from the first stage is further reacted with ethylene glycol to continue depolymerization. Sufficient ethylene glycol is fed to the unit to degrade the waste into a liquid solution. The quantity of ethylene glycol used, however, is low enough that substantially all is consumed in the unit. Typically, ethylene glycol is fed in sufficient quantity to achieve a ratio of ethylene glycol units to terephthalate units in the waste of about 1.3 to 2.0.

Ethylene glycol for the glycolysis unit is conveniently obtained from the polyethylene terephthalate manufacturing process wherein (1) dimethyl terephthalate and ethylene glycol are reacted to prepare dihydroxyethyl terephthalate and methanol, and (2) the dihydroxyethyl terephthalate is condensed to polyethylene terephthalate concurrent with the removal of ethylene glycol. This ethylene glycol contains solid contaminants. The impure ethylene glycol is readily fractionated, with the impure bottoms serving as feed to the glycolysis unit. In this manner, ethylene glycol used in the polyethylene terephthalate manufacturing process is continuously purified.

Glycol-degraded waste solution, withdrawn from the glycolysis unit by line 3, contains dihydroxyethyl terephthalate and oligomers thereof, diethylene glycol, residual ethylene glycol, and the various impurities and additives present in the wastes. The solution is filtered to remove any gross impurities introduced with the wastes, and pumped to an ester exchange column wherein it is reacted with methanol to convert dihydroxyethyl terephthalate and oligomers present in the glycol-degraded solution to dimethyl terephthalate. Zinc acetate catalyst in methanol solution is injected into the ester column through line 4 at a concentration of about 200 ppm by weight, based on the weight of glycol-degraded waste. Methanol is fed to the column through line 5 at a rate sufficient to maintain a weight ratio of methanol to glycol-degraded waste of about 3 to 1 in the column. At a lower section of the column, phosphoric acid sequestering agent in methanol solution is injected to the column through line 6 to deactivate the catalyst at a point where the reaction has reached its desired degree of completion.

Figure 2:
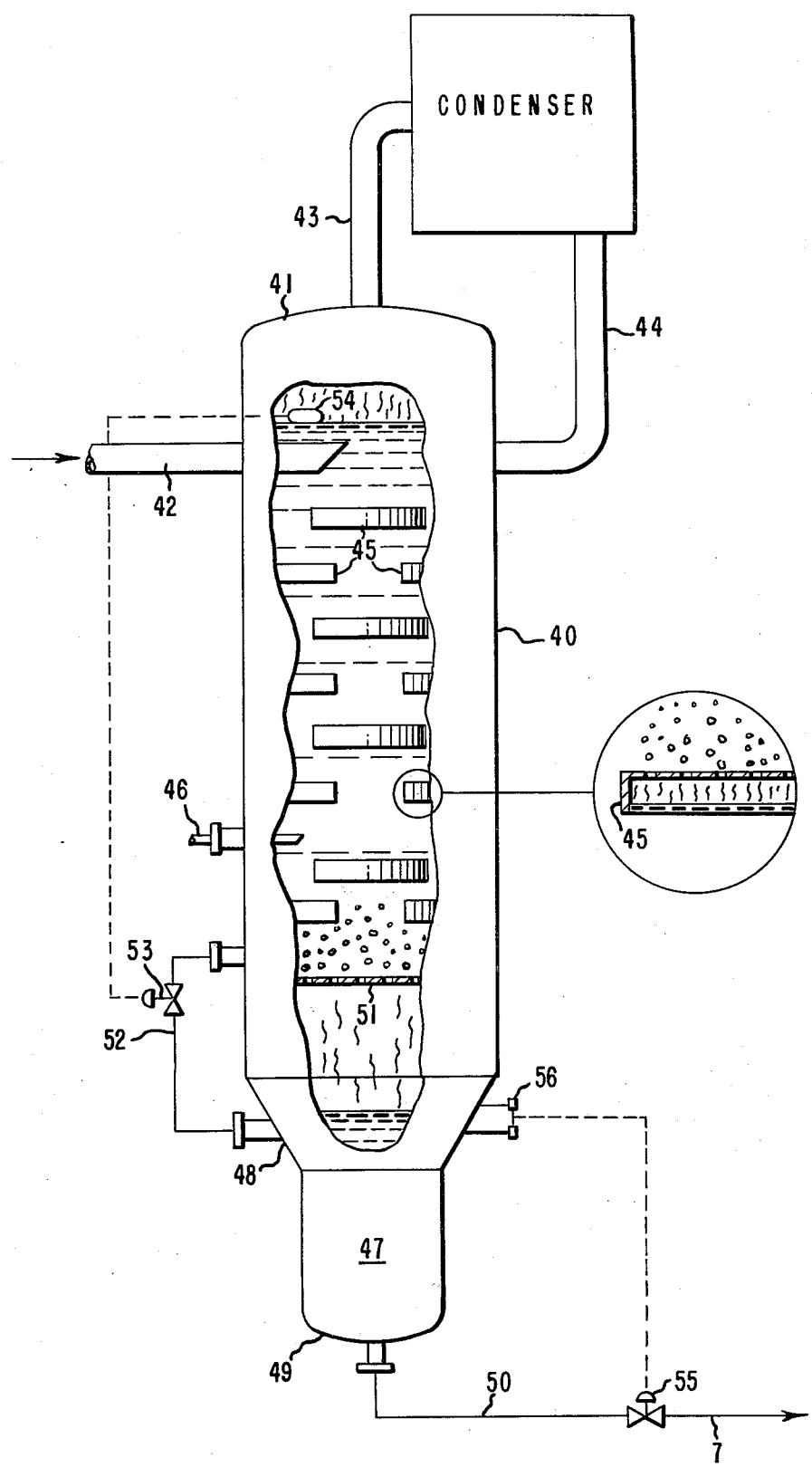
FIG. 2 is a vertical view, in partial section, of a preferred ester exchange column useful in the process of FIG. 1.

Referring now to FIG. 2, a preferred ester exchange column is a partially filled closed vessel having an upper reaction zone for the ester exchange reaction, and a lower reboiler zone for evaporation of methanol vapors.

The reaction zone is a right cylinder section of the closed vessel 40 and is provided with an entrance line 42 mounted in the upper portion thereof for the introduction of reactants, and an injection nozzle 46 mounted in the lower portion thereof for the introduction of catalyst sequestering agent. A hemispherical top 41 is provided having a port for the continuous removal of vapors, primarily methanol, from the vessel. The vapors are continuously fed to a condenser COND by line 43, wherein the vapors are condensed. Liquid from the condenser is continuously returned to the vessel by line 44.

A purge line (not shown) is installed in condenser vapor line 43. The purge line has a pressure relief valve to control column temperature and pressure, providing smooth, continuous operation in the case of feed fluctuations and preventing undue buildup of inert gas in the condenser recycle loop and vapor space above the reaction zone. A typical control valve setting is 500 psi. The column pressure, and temperature, equilibrates at the control valve setting, resulting in a small flow of vapors in the purge line when the feed fluctuates or inerts accumulate.

Perforated trays 45, baffles, or other structures having a suitable design to impede downward flow of reactants and to promote liquid-vapor contact, without being plugged by solids present in the glycol-degraded wastes, are mounted in the reaction zone. Preferred perforated trays, shown in the enlargement, have lips which extend below the tray, and the holes are sized small enough to impede downward flow of liquids through the holes but large enough to permit upward flow and bubbling of vapors through the holes. In this design, the lips serve to trap vapor beneath the trays, restricting the upward flow of vapor to passage through the perforated tray. Trays having holes of about 0.25-inch diameter on a 1.25-inch triangular spacing are suitable under the operating conditions described hereinafter for the preparation of dimethyl terephthalate.

The reboiler zone forms the bottom section of the closed vessel. This zone is constructed to have a large surface area for transfer of heat into liquid contained therein, and to contain a limited volume of liquid so that residence time in the reboiler zone is short enough to minimize reactions between dimethyl terephthalate and other constituents of the liquid.

In the embodiment shown in the drawing, the reboiler zone is defined by a right cylinder section 47 of smaller diameter than the reaction zone wall 40, a truncated conical section 48 which connects the walls of the reaction and reboiler zones, and a hemispherical bottom section 49 having an exit port which communicates with line 50 for removal of product from the closed vessel. The reboiler zone is internally heated by immersed heating tubes (not shown).

A perforated barrier plate 51 is mounted in the closed vessel below the lowest tray 45 extending across the entire cross-sectional area of the vessel. This barrier plate divides the vessel into the reaction and reboiler zone. The perforations are sized small enough to prevent any substantial liquid flow through the barrier plate, but large enough to permit upward flow of vapors from the reboiler to the reaction zone. A barrier plate having 0.25-inch diameter holes on a 2.25-inch triangular spacing is suitable under the operating conditions described herein for the preparation of dimethyl terephthalate.

A by-pass conduit 52 is provided which communicates with an exit port located in the reaction zone above the barrier plate and with an entrance port located below the liquid level in the reboiler zone. Mounted in the by-pass line is a control valve 53 responsive to a float 54 mounted in the reaction zone to maintain a constant liquid level in the reaction zone. The by-pass line presents a sufficient liquid head to prevent reverse flow of liquids from the reboiler to the reaction zone. If necessary, a pump or other means can be installed in the by-pass line to insure that liquid only flows from the reaction zone to the reboiler zone. A predetermined liquid level is maintained in the reboiler zone by a control valve 55 mounted in line 50 for the withdrawal of liquid. This valve is respnsive to a level-sensing device 56, such as a manometer, which detects the reboiler liquid level.

In operation, premixed ethylene glycol-degraded polyethylene terephthalate waste, methanol, and zinc acetate are heated to 190° to 230°C. and then pumped to the vessel through line 48. The feed contains a sufficient amount of methanol to maintain a stoichiometric excess in the reaction zone, generally a weight ratio of at least 2 to 1, preferably at least 3 to 1, methanol to glycol-degraded waste. The feed contains about 200 ppm by weight of zinc acetate catalyst, based on weight of the glycol-degraded waste.

Pressure of the reaction zone is maintained substantially at the partial vapor pressure of methanol in the reaction zone to prevent any significant quantity of methanol feed from evaporating. The pressure is controlled by a valve in the purge line as discussed hereinbefore. In the reaction zone, dimethyl terephthalate and ethylene glycol are formed by ester exchange between methanol and the glycol-degraded waste.

The liquid reaction solution slowly passes downward through the reaction zone, by passage through spaces between the perforated trays. At a point in the lower region of the reaction zone where the ester exchange has reached the desired degree of completion (e.g., when about 90 percent or more of the terephthalate values in the feed solution have been converted to dimethyl terephthalate), the solution comes into contact with a catalyst sequestering agent, typically phosphoric acid, introduced through line 46. At this point, the catalyst is deactivated and methanol can be removed from the solution without significantly reversing the ester exchange reaction.

After the catalyst has been deactivated, the hot solution is withdrawn from the reaction zone and introduced to the reboiler zone through line 52. The reboiler zone is heated to a temperature sufficiently higher than that of the reaction zone to evolve methanol vapors having a pressure high enough to overcome resistance to upward vapor flow presented by the liquid head, superatmospheric pressure, and trays in the ester exchange column. Methanol vapors continuously pass through the barrier plate and bubble upward through liquid in the reaction zone, continuously agitating the liquid, and into the vapor space at the top of the vessel. Ascending vapors, as they pass through the reaction zone, collect beneath trays 45 and are redispersed as bubbles by passing through the tray perforations.

Ethylene glycol and other vapors evolved in the reboiler also pass through the barrier plate but are condensed as they rise through the reaction zone. Condensation primarily occurs in the lower region of the reaction zone and does not affect the ester exchange dimethyl terephthalate yield to any significant extent.

Pressure in the vapor space at the top of the vessel is maintained substantially at the partial vapor pressure of methanol at the reaction zone temperature so that significant quantities of methanol are only evolved in the reboiler zone, i.e., methanol is evaporated after the ester exchange catalyst has been deactivated. Vapors at the top of the column, primarily methanol, exit the vessel through line 43, are condensed, and are returned to the vessel by line 44. The small quantity of vapor removed by the purge line is introduced to a unit in the recovery train, such as the DEG stripper.

The reaction zone is typically maintained at 200°C. and at a pressure of about 50 to 550 psia, with liquids in the reboiler zone being heated to 220° to 230°C. Under these conditions, and employing about a 60-minute holding time in the reaction zone and up to a 10-minute holding time in the reboiler zone, dimethyl terephthalate yields up to about 87 percent or more of the theoretical yield are obtained while reducing the methanol content in the solution by up to about 70% or more.

Referring back to FIG. 1, hot solution continuously withdrawn from the reboiler zone of the ester exchange column contains dimethyl terephthalate, methanol, ethylene glycol, diethylene glycol, catalyst residues, solids introduced with the wastes, and small quantities of unreacted glycol-degraded waste, hydroxyethyl methyl terephthalate, and condensation byproducts of dimethyl terephthalate. This solution, while still under superatmospheric pressure, is continuously fed to a closed continuous flasher unit having rectification trays, a heating jacket, and a reflux condenser. Substantially all of the methanol is flashed from the solution, condensed, and recovered by the proper selection of pressure and temperature within the flasher unit. At atmospheric pressure, a temperature of about 150°C. is effective.

Methanol condensate is removed from the flasher unit by line 8. The condensate can be further heated and combined, under pressure, with makeup methanol feed to the ester exchange column or it can be directed to a reservoir for future use. Dimethyl terephthalate-rich solution leaving the flasher unit by line 9 contains only traces of methanol. The solution is at a low enough temperature, about 150°C., that further reactions of the dimethyl terephthalate do not occur to any significant extent.

The solution is then continuously fed to a centrifuge CENT wherein catalyst residues and insoluble additives present in the waste are removed for disposal or recovery of chemical values. Liquid solution is continuously removed from the centrifuge and fed to a stripping column DMT STRIP by line 10. This column separates the solution into an aliphatic condensate fraction and an aromatic heel fraction.

The DMT STRIP unit is a vacuum distillation column provided with a reboiler section maintained at about 200° to 230°C. and a reflux condenser. A portion of the condensate is removed by line 11 for recovery of ethylene glycol, with the balance of the condensate being refluxed to the column. An aromatic stream 12 is continuously withdrawn from the reboiler for the recovery of dimethyl terephthalate. A short holdup time, such as 10 to 15 minutes, is provided in the reboiler to minimize reaction of dimethyl terephthalate with other components in the solution. To keep the level of diethylene glycol present in aromatic stream 12 within acceptable limits (generally less than 250 ppm), and to minimize carry-over of dimethyl terephthalate in aliphatic stream 11 (generally a 7 percent carry-over is acceptable), the proper column temperature profile which achieves these goals is determined by varying the reboiler heat input and, when determined, is maintained constant. Temperature control is conveniently achieved by sensing the temperature of any plate in the column, and adjusting the reboiler heat input in response to deviations in the plate temperature.

Aliphatic stream 11 leaving the DMT STRIP unit contains ethylene glycol, diethylene glycol, and the small quantities of carried-over dimethyl terephthalate. It is desired to remove diethylene glycol for purge from the system and to recover the ethylene glycol and dimethyl terephthalate for recycle. Therefore, stream 11 is continuously fed to a DEG STRIP unit for separation of these values.

The DEG STRIP unit is a vacuum distillation column provided with a reboiler section typically maintained at about 150°C. and a reflux condenser. Ethylene glycol is recovered as condensate stream 13 for reuse, either as part of makeup stream 2 for the glycolysis unit or preferably for forwarding to a polyethylene terephthalate manufacturing line. Diethylene glycol is continuously removed from the reboiler section as stream 14 for disposal. By operating the column in the same manner as has been described for the DMT STRIP unit, essentially all of the diethylene glycol is separated for disposal and much of the dimethyl terephthalate is carried over in the ethylene glycol stream and thus ultimately recovered. For example, the unit can be operated such that the ethylene glycol stream contains 0.1 mole percent, or less, diethylene glycol and about 70 percent, or more, of the dimethyl terephthalate entering the unit.

Aromatic stream 12 leaving the DMT STRIP unit contains dimethyl terephthalate, hydroxyethyl methyl terephthalate, oligomers, and aromatic esters of methanol and ethylene glycol. This stream is continuously fed to a DMT PURIFY unit where the dimethyl terephthalate is recovered.

The DMT PURIFY unit is a distillation column operated at reduced pressure, such as 65 mm. Hg, having a reboiler maintained at about 250° to 280°C. A short residence time, such as 10 to 15 minutes, is used to minimize loss of dimethyl terephthalate by reaction with glycol esters present in the aromatic stream. Dimethyl terephthalate is recovered as condensate stream 15 and has sufficient purity to be used in the manufacture of high-quality polyethylene terephthalate.

A liquid stream 16 containing hydroxyethyl methyl terephthalate, residual dimethyl terephthalate, and other aromatic esters, is continuously withdrawn from the bottom of the DMT PURIFY unit. A small portion of this stream is purged to prevent undue buildup of impurities in the process and the major portion of the stream is recycled to the ester exchange column.

The process is a highly efficient, but simple, method of recovering dimethyl terephthalate having sufficient purity to be used in the manufacture of high-quality polyethylene terephthalate. Up to about 95 percent of the terephthalate values present in the waste can be recovered when employing the various recycle lines described in the preferred embodiment. Moreover, the process, in its preferred embodiments, recovers ethylene glycol having suitable purity for use in manufacturing high-quality polyethylene terephthalate and can be used to purify ethylene glycol generated during the condensation polymerization of polyethylene terephthalate. The various recycle lines employed in the preferred embodiments also minimize effluent wastes, minimizing waste disposal problems and ecological impact of the process.

While the process has been described in detail with respect to recovery of film wastes, it will be understood that other wastes can be recovered using the process. For example, fiber wastes or articles, such as bottles, can serve as the feed material to the process.

We claim:

1. In a process for the recovery of dimethyl terephthalate from polyethylene terephthalate waste by:
   1. dissolving and reacting the waste with ethylene glycol to prepare liquid reaction solution,
   2. contacting the liquid reaction solution with an excess of methanol and an ester exchange catalyst at an elevated temperature and superatmospheric pressure to prepare dimethyl terephthalate, and
   3. recovering dimethyl terephthalate from the liquid reaction solution, the improvement wherein the process is continuous, in step (2) the weight ratio of methanol to liquid reaction solution is at least about 2 to 1 and the elevated temperature is about 180° to 300°C., and wherein undesired solids are eliminated prior to recovery of the dimethyl terephthalate by:

a. introducing a sequestering agent to the hot liquid reaction solution of step (2), before release of the superatmospheric pressure, to deactivate the ester exchange catalyst,
   b. distilling excess methanol from the hot liquid reaction solution, and
   c. removing solids from the hot liquid reaction solution at a temperature above about 125°C.

2. The process of claim 1 wherein the polyethylene terephthalate waste is dissolved and reacted with ethylene glycol in two stages, the first stage being at atmospheric pressure and a temperature of about 210° to 260°C. and the second stage being under pressure and a temperature of about 220° to 250°C.

3. The process of claim 1 wherein the weight ratio of methanol to degraded waste in step (2) is at least 3 to 1.

4. The process of claim 1 wherein, in step (b), excess methanol is distilled from the hot liquid reaction solution in two stages, the first stage being under superatmospheric pressure and at a temperature higher than the elevated temperature of step (2), and the second stage being at a reduced pressure.

5. The process of claim 4 wherein methanol evaporated in the first stage is returned to step (2) by passage through a methanol vapor barrier.

6. The process of claim 4 wherein methanol evaporated in the second stage is condensed and recycled to step (2).

7. The process of claim 1 wherein the step (c) solids are removed from the hot liquid reaction solution by centrifuging the solution.

8. The process of claim 1 wherein in step (c) solids are removed from the hot liquid reaction by filtering the solution.

9. The process of claim 1 wherein in step (c) solids are removed from the hot liquid reaction solution by sedimentation.

10. The process of claim 1 wherein in step (3) dimethyl terephthalate is recovered from the hot liquid reaction solution by heating the solution to distill first aliphatic components therefrom, and then the dimethyl terephthalate.

11. The process of claim 10 wherein ethylene glycol is recovered from the aliphatic components and is recycled to be used in the manufacture of polyethylene terephthalate.

12. The process of claim 10 wherein ethylene glycol is recovered from the aliphatic components and is recycled to step (1).

13. The process of claim 10 wherein the residue from distilling the dimethyl terephthalate is recycled to step (2).

14. The process of claim 1 wherein the ethylene glycol is from a polyethylene terephthalate manufacturing process.

15. The process of claim 1 wherein the ester exchange catalyst is a metal salt of acetic acid or an organic amine.

16. The process of claim 1 wherein the sequestering agent is a phosphorus compound or an aliphatic or aromatic dicarboxylic acid.

17. The process of claim 1 wherein the polyethylene terephthalate waste is scrap film.

* * * * *

UNITED STATES PATENT OFFICE
CERTIFICATE OF CORRECTION

Patent No. 3,907,868    Dated September 23, 1975

Inventor(s) Robert Marion Currie, Shubert Gernt Measamer, and Donald Nelson Miller It is certified that error appears in the above-identified patent and that said Letters Patent are hereby corrected as shown below:

Column 1, line 34, "polyethylene" should read -- polyethylene terephthalate --.

Column 5, line 11, "tetradosodium" should read -- tetrasodium --.

Column 5, line 47, "methanol vapors" should read -- methanol vapor barrier. Subsequently, residual methanol vapors --.

Column 5, line 68, "clotting" should read -- clogging --.

Column 7, line 3, "the impure" should read -- the pure distillate being recycled to step (1) of the process and impure --.

Column 7, line 18, "ester column" should read -- ester exchange column --.

Column 7, line 49, "gas" should read -- gases --.

Column 8, line 47, "respnsive" should read -- responsive --.

Column 12, line 28, "the step (c)" should read -- in step (c) --.

Column 12, line 32, "reaction by" should read "reaction solution by --.

Signed and Sealed this twenty-third Day of March 1976

[SEAL]

Attest:

RUTH C. MASON
Attesting Officer

C. MARSHALL DANN
Commissioner of Patents and Trademarks